(12) United States Patent
Kumagai et al.

(10) Patent No.: US 7,168,733 B2
(45) Date of Patent: Jan. 30, 2007

(54) AIRBAG APPARATUS

(75) Inventors: Masayoshi Kumagai, Shiga (JP); Kazuhiko Joujima, Hikone (JP); Kei Tsujimoto, Hikone (JP)

(73) Assignee: Takata Corporation, Tokyo (JP)

( * ) Notice: Subject to any disclaimer, the term of this patent is extended or adjusted under 35 U.S.C. 154(b) by 60 days.

(21) Appl. No.: 10/667,463

(22) Filed: Sep. 23, 2003

(65) Prior Publication Data

US 2005/0189742 A1    Sep. 1, 2005

(30) Foreign Application Priority Data

Dec. 27, 2002  (JP)  ............ 2002-380190
Feb. 26, 2003  (JP)  ............ 2003-049537
Mar. 6, 2003   (JP)  ............ 2003-060107

(51) Int. Cl.
    *B60R 21/16*     (2006.01)
(52) U.S. Cl. .................... 280/730.2
(58) Field of Classification Search ......... 280/730.2, 280/730.1, 743.1
    See application file for complete search history.

(56) References Cited

U.S. PATENT DOCUMENTS

| | | | | |
|---|---|---|---|---|
| 3,642,303 A | * | 2/1972 | Irish et al. | ......... 280/730.1 |
| 3,768,830 A | * | 10/1973 | Hass | ......... 280/729 |
| 4,262,931 A | | 4/1981 | Strasser et al. | |
| 5,161,821 A | * | 11/1992 | Curtis | ......... 280/730.2 |
| 5,273,309 A | | 12/1993 | Lau et al. | |
| 5,556,128 A | | 9/1996 | Sinnhuber et al. | |
| 5,632,506 A | | 5/1997 | Shellabarger | |
| 5,718,450 A | * | 2/1998 | Hurford et al. | ......... 280/730.2 |
| 5,722,685 A | * | 3/1998 | Eyrainer | ......... 280/730.2 |
| 5,775,729 A | | 7/1998 | Schneider et al. | |
| 5,803,485 A | | 9/1998 | Acker et al. | |
| 5,845,935 A | | 12/1998 | Enders et al. | |
| 5,957,493 A | * | 9/1999 | Larsen et al. | ......... 280/743.1 |
| 6,065,772 A | * | 5/2000 | Yamamoto et al. | ......... 280/730.2 |
| 6,126,196 A | | 10/2000 | Zimmerman | |
| 6,260,878 B1 | | 7/2001 | Tanase | |
| 6,349,964 B1 | | 2/2002 | Acker et al. | |
| 6,402,190 B1 | | 6/2002 | Heudorfer et al. | |
| 6,543,804 B2 | | 4/2003 | Fischer | |
| 2004/0130127 A1 | * | 7/2004 | Kurimoto et al. | ......... 280/729 |

FOREIGN PATENT DOCUMENTS

| | | |
|---|---|---|
| DE | 195 41 513 A1 | 5/1996 |
| DE | 198 50 448 A1 | 5/2000 |
| DE | 199 30 157 A1 | 1/2001 |
| EP | 1 340 656 | 9/2003 |
| EP | 1 595 751 A1 | 11/2005 |
| GB | 2 350 332 | 11/2000 |

(Continued)

*Primary Examiner*—Faye M. Fleming
(74) *Attorney, Agent, or Firm*—Manabu Kanesaka

(57) ABSTRACT

An airbag apparatus includes an airbag having an occupant-side surface and a vehicle-body-side surface opposite to the occupant-side surface when the airbag is inflated, and at least an upper chamber and a lower chamber separated from each other; a gas generator for deploying the airbag; and a gas distributor enclosing the gas generator and having outlet ports for allowing gas from the gas generator to flow into the upper chamber and the lower chamber. A check valve is provided for preventing the gas from flowing from the lower chamber to the upper chamber.

13 Claims, 10 Drawing Sheets

FOREIGN PATENT DOCUMENTS

| | | |
|---|---|---|
| JP | 4-20857 | 2/1992 |
| JP | 10-100827 | 4/1998 |
| JP | 10-147201 | 6/1998 |
| JP | 10-181752 | 7/1998 |
| JP | 10-217896 | 8/1998 |
| JP | 10-273010 | 10/1998 |
| JP | 2933894 | 5/1999 |
| JP | 11-157406 | 6/1999 |
| JP | 11-157407 | 6/1999 |
| WO | WO2004/067333 | 8/2004 |

* cited by examiner

… … …

AIRBAG APPARATUS

BACKGROUND OF THE INVENTION AND RELATED ART STATEMENT

The present invention relates to an airbag apparatus for protecting an occupant in a vehicle in case of a side collision, a roll over, and the like. More specifically, the present invention relates to an airbag apparatus having an airbag with an interior divided into a plurality of chambers.

An airbag apparatus for a side collision is known in which an airbag is deployed at a side of an occupant by a gas inflator, so that the deployed airbag receives the occupant.

Japanese Patent Publication (Kokai) No. 2000-177527 has disclosed a configuration in which a lower portion of an airbag is deployed with an internal pressure higher than that of an upper portion for receiving a lumbar region, or a middle part, of the occupant.

FIG. 15 is a side view of a seat having the airbag apparatus for a side collision disclosed in Japanese Patent Publication (Kokai) No. 2000-177527, and FIG. 16 is an enlarged cross sectional view of a portion 16 in FIG. 15.

An airbag 18 is divided into an upper chamber 20 and a lower chamber 22 by a seam 24. A rear end of the seam 24 is slightly away from a rear edge of the airbag 18, and a cylindrical tubular housing 30 is arranged at a gap or space between the rear end of the seam 24 and the rear edge of the airbag 18. A rod-shaped gas generator 36 is disposed in the tubular housing 30. Upper and lower ends of the tubular housing 30 are provided with pipe clips 32 and 34, so that the gas generator 36 is fixed with the pipe clips 32 and 34. The pipe clips 32 and 34 seal between the gas generator 36 and the tubular housing 30. The pipe clips 32 and 34 are attached to mounting positions 26 on a seatback 14.

The tubular housing 30 is provided with outlet ports 42 for the upper chamber for allowing gas to flow from the gas generator 36 into the upper chamber 20 and outlet ports 44 for the lower chamber for allowing gas to flow into the lower chamber 22. An opening area of the outlet ports 44 for the lower chamber is larger than an opening area of the outlet ports 42 for the upper chamber. Therefore, when the gas generator 36 is activated, the airbag 18 is inflated with an internal pressure of about 0.5 bar for the upper chamber 20 and an internal pressure of about 1.5 bar for the lower chamber 22.

In the airbag apparatus for a side collision disclosed in Japanese Patent Publication (Kokai) No. 2000-177527, the tubular housing 30 is used. Therefore, when the lower chamber 22 of the deployed airbag 18 receives the occupant, the gas in the lower chamber 22 flows through the tubular housing 30 into the upper chamber 20. Therefore, it is difficult to maintain the gas pressure in the lower chamber for a long time. Further, in the airbag apparatus for a side collision disclosed in Japanese Patent Publication (Kokai) No. 2000-177527, a space is formed between the rear end of the seam 24 and the rear edge of the gas distributor 30. Accordingly, the gas leaks from the lower chamber 22 with a higher inner pressure to the upper chamber 20 with a lower inner pressure. Therefore, the gas pressure of the lower chamber 22 decreases relatively quickly.

In view of the problems described above, the present invention has been made, and an object of the present invention is to provide an airbag apparatus in which a gas pressure in a lower chamber is maintained at a high pressure for a sufficiently long time.

Further objects and advantages of the invention will be apparent from the following description of the invention.

SUMMARY OF THE INVENTION

According to the first aspect of the present invention, an airbag apparatus includes an airbag including an occupant-side surface facing an occupant when deployed, and a vehicle-body-side surface opposite to the occupant-side surface, and having an interior divided into a plurality of chambers including at least two chambers, i.e. an upper chamber and a lower chamber; a gas generator for deploying the airbag; and a gas distributor enclosing the gas generator and including outlet ports for allowing gas from the gas generator to flow into at least the upper chamber and the lower chamber. The outlet port of the gas distributor for the lower chamber has an opening larger than that of the outlet port thereof for the upper chamber, and a check valve is provided for preventing the gas from flowing from the lower chamber to the upper chamber.

In the first aspect of the present invention, the airbag apparatus has the outlet port for the lower chamber having an opening larger than that of the outlet port for the upper chamber. Therefore, the lower chamber is deployed earlier than the upper chamber, and an internal pressure of the lower chamber is higher than that of the upper chamber. In addition, the gas is prevented from flowing from the lower chamber to the upper chamber by the check valve. Therefore, the pressure in the lower chamber is maintained at a high level for a long time. The airbag apparatus can protect the occupant in the case of not only a side collision, but also an overturn.

According to the first aspect of the present invention, the gas distributor is formed of a sheet wrapping the gas generator. The outlet port of the gas distributor for the lower chamber extends toward the lower chamber more than the gas generator, so that the extended portion constitutes the check valve. With this construction, the gas distributor includes the check valve, thereby making the configuration simple and reducing a manufacturing cost.

According to the first aspect of the present invention, the sheet may be rolled in a cylindrical shape. One edge of the sheet overlaps the other edge thereof, and a mounting member of the gas generator passes through the overlapped edges. With this configuration, the gas distributor can be constructed just through rolling the flat sheet into a cylindrical shape and passing the mounting member (for example a bolt) of the gas generator through the edges. Accordingly, it is possible to significantly simplify a process of manufacturing the gas distributor.

According to the first aspect of the present invention, preferably, a bent unit may be provided for allowing the gas to flow from the upper chamber to an outside of the airbag. When the gas flows out from the upper chamber through the bent unit, it is possible to absorb an impact on the occupant crushing into the upper chamber.

According to the second aspect of the invention, an airbag apparatus includes an airbag including an occupant-side surface facing an occupant when deployed and a vehicle-body-side surface opposite to the occupant-side surface, and having an interior divided into a plurality of chambers including at least two chambers, i.e. an upper chamber and a lower chamber; a gas generator for deploying the airbag; and a communicating portion for communicating the upper chamber and the lower chamber. A check valve is also provided for preventing gas from flowing from the lower chamber to the upper chamber.

In the second aspect of the present invention, the airbag apparatus includes the check valve for preventing the gas from flowing from the lower chamber to the upper chamber.

Therefore, the pressure in the lower chamber is maintained at a high level for a long time.

According to the second aspect of the invention, it is also possible to provide a vent unit for allowing the gas to flow out from the upper chamber to an outside of the airbag.

According to the second aspect of the invention, the occupant-side surface and the vehicle-body-side surface are joined, and a partitioning joint line extending linearly defines the plurality of the chambers. A part of the partitioning joint line is positioned away from one side edge of the airbag to form the communicating portion in the airbag. A part of the check valve is attached to the occupant-side surface and the vehicle-body-side surface by the partitioning joint line. With this configuration, it is possible to make a mounting structure of the check valve simple and make a manufacturing process easy.

According to the third aspect of the present invention, an airbag device includes an airbag having an interior separated into a plurality of chambers including an upper chamber and a lower chamber by at least one separating means; a cylindrical gas generator disposed in the airbag; and a cylindrical gas distributor disposed in the airbag for holding the gas generator therein and having outlets for introducing gas to the upper chamber and the lower chamber from the gas generator. The airbag has a hole at a vicinity of the gas distributor. Sealing means seals a periphery of the hole in an airtight manner, and is connected with at least one of the separating means. A clamp member is disposed around the gas distributor through the hole at an outside of the airbag, and presses the airbag against a periphery of the gas distributor.

In the third aspect of the present invention, the airbag device has the separating means connected with the sealing means at the periphery of the hole. Further, the clamp member presses and fixes the side of the hole to the gas distributor. With this configuration, it is possible to eliminate a gap in a conventional device, so that the upper chamber is separated from the lower chamber in a highly airtight manner. Accordingly, an inner pressure of the lower chamber is maintained sufficiently high for a longer period of time.

According to the third aspect of the present invention, the airbag device may include at least one middle chamber between the upper chamber and the lower chamber. In such a case, it is possible to directly supply the gas to the middle chamber from the gas distributor. As a result, it is possible to quickly inflate the middle chamber of the airbag.

According to the third aspect of the present invention, the gas may flow into the middle chamber via the upper chamber. As a result, when the occupant contacts the upper chamber, the gas gradually flows into the middle chamber from the upper chamber so as to absorb an impact on the occupant.

According to the third aspect of the present invention, a plurality of holes may preferably be provided along the gas distributor so that each of the holes is connected with the respective separating means to form the middle chamber. In this case, a gas outlet for the middle chamber may be provided in the gas distributor between the separating means. Accordingly, it is possible to directly supply the gas to the middle chamber from the gas distributor.

According to the third aspect of the present invention, a plurality of the separating means may be connected with a common hole, and the middle chamber is provided between the separating means. In this case, the gas is introduced to the middle chamber via, for example, the upper chamber. With this configuration, it is possible to reduce the number of holes.

DETAILED DESCRIPTION OF PREFERRED EMBODIMENTS

Figure 1:
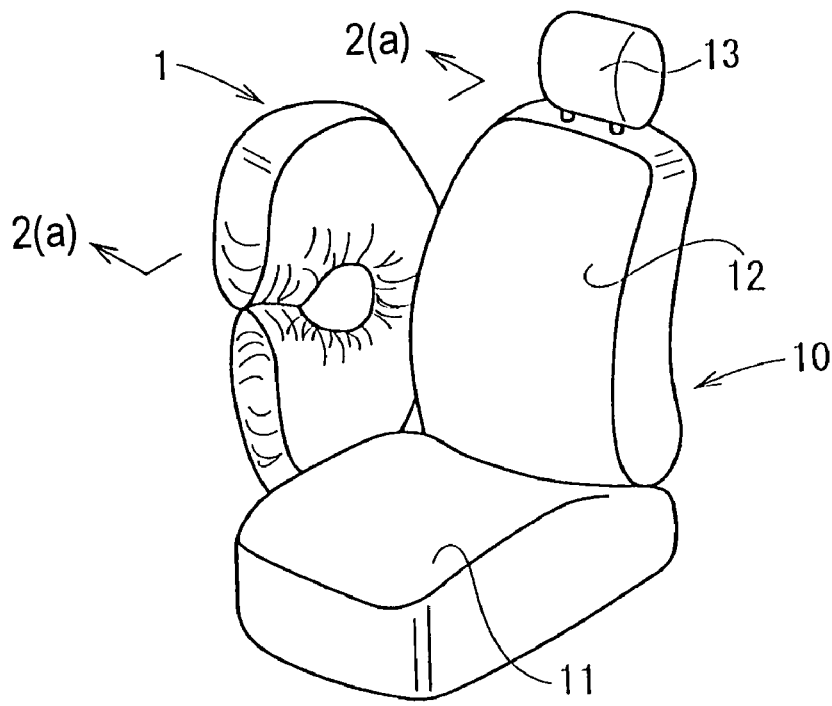
FIG. 1 is a perspective view of a seat of a vehicle provided with an airbag apparatus for a side collision according to the first aspect of the invention.
Figure 2A:
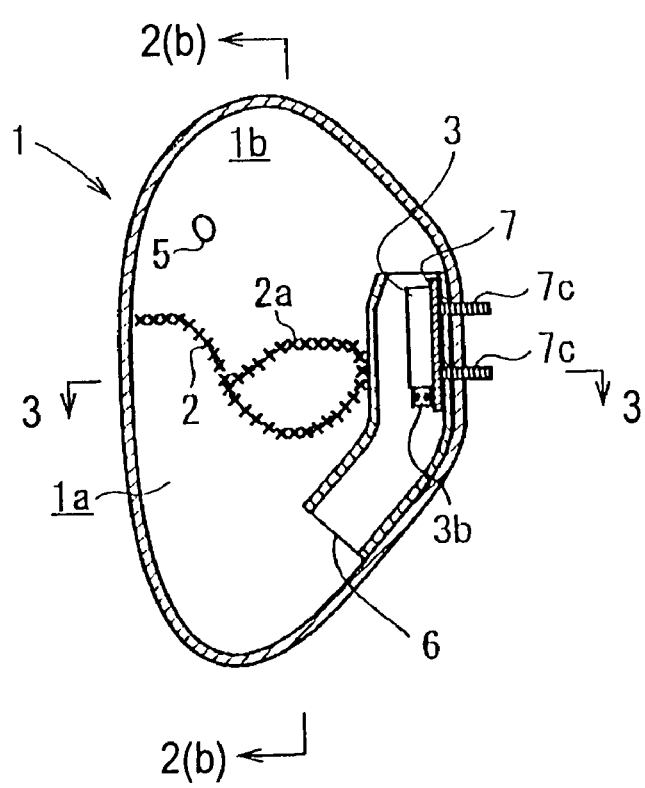
FIG. 2(a) is a cross sectional view taken along line 2(a)—2(a) in FIG. 1.
Figure 2B:
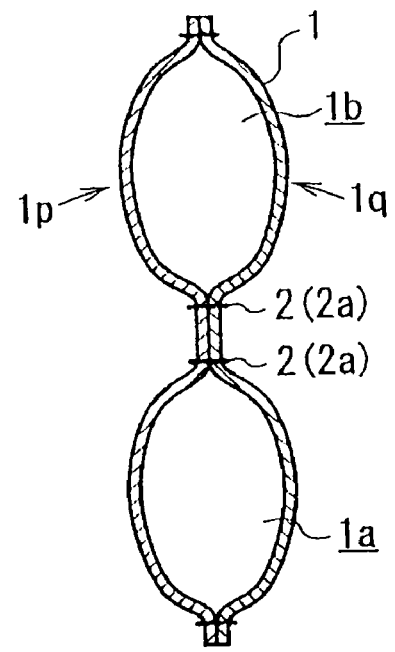
FIG. 2(b) is a cross-sectional view taken along line 2(b)—2(b) in FIG. 2(a)
Figure 3:
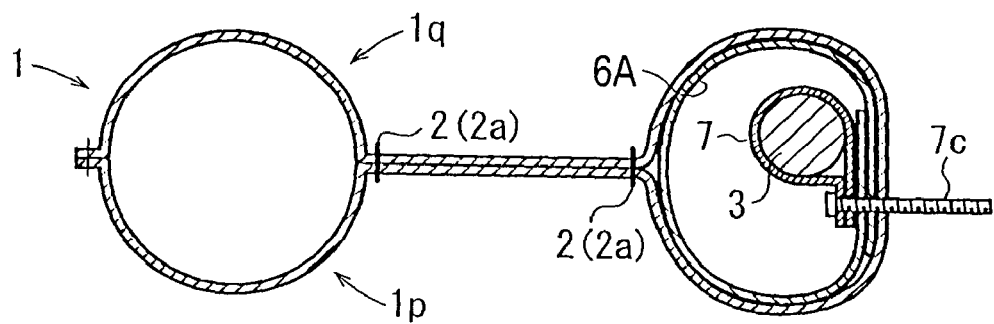
FIG. 3 is a cross sectional view taken along line 3—3 in FIG. 2(a)
Figure 4:
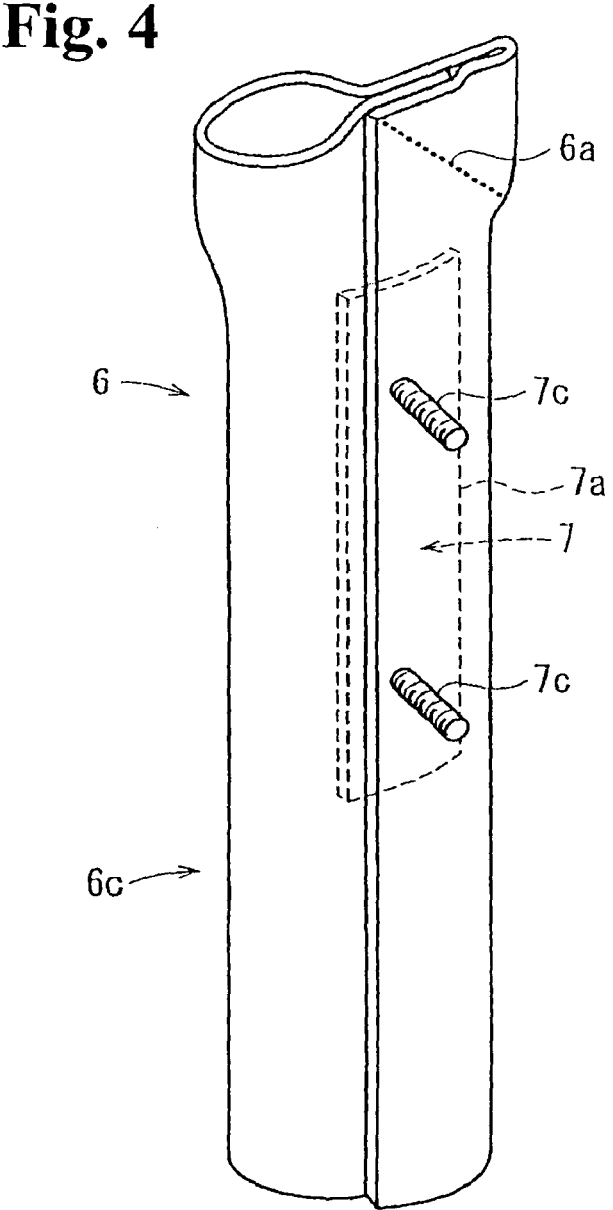
FIG. 4 is a perspective view of a gas distributor used for the airbag apparatus.
Figure 5:
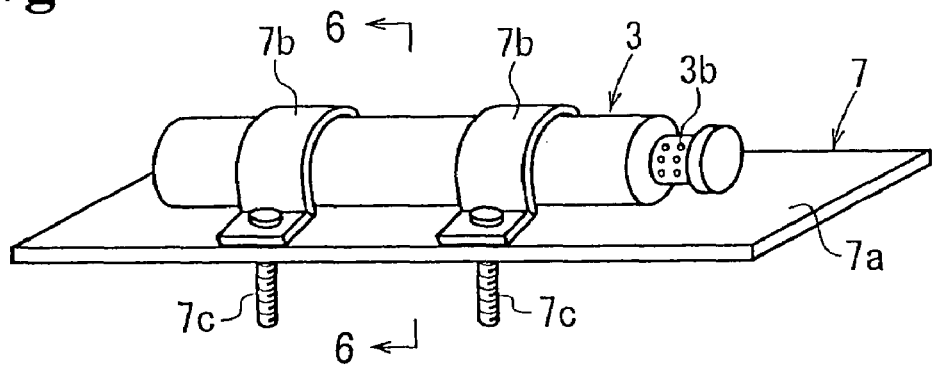
FIG. 5 is a perspective view of a gas generator and a holder of the airbag apparatus.
Figure 6:
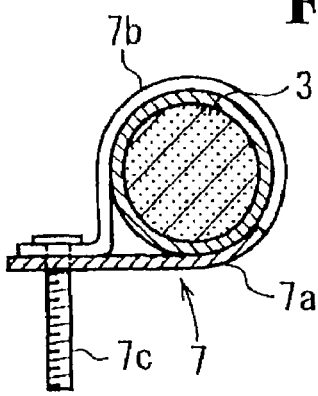
FIG. 6 is a cross sectional view taken along line 6—6 in FIG. 5.

Hereunder, embodiments of the first aspect of the present invention will be explained with reference to the accompanying drawings. FIG. 1 is a perspective view of a seat of a vehicle provided with an airbag apparatus for a side collision according to the present invention. FIG. 2(a) is a cross sectional view taken along line 2(a)—2(a) in FIG. 1, and FIG. 2(b) is a cross-sectional view taken along line 2(b)—2(b) in FIG. 2(a). FIG. 3 is a cross sectional view taken along line 3—3 in FIG. 2(a). FIG. 4 is a perspective view of a gas distributor used for the airbag apparatus. FIG. 5 is a perspective view of a gas generator and a holder of the airbag apparatus. FIG. 6 is a cross sectional view taken along line 6—6 in FIG. 5.

As shown in FIG. 1, an airbag 1 is constructed to be deployed along a window side of a seat 10. The seat 10 is provided with a seat cushion 11, a seat back 12, and a headrest 13. A case (not shown) of an airbag apparatus is mounted to a side of the seatback 12. The airbag 1 is folded and stored in the case, and is covered with a module cover (not shown).

The airbag 1 has a bag shape, and is formed of two sheet members such as cloth, resin sheet, or the like (cloth in this embodiment) with peripheral edges stitched together. An interior of the airbag is divided into a lower chamber 1a at a lower side and an upper chamber 1b at an upper side by a linear connected portion (seam in this embodiment) 2. The seam 2 connects an occupant-side surface 1p and a vehicle-body-side surface 1q at a side opposite to the occupant-side surface 1p of the airbag 1. The seam 2 has a shape of substantially like number six with a looped portion 2a.

As shown in FIG. 2(*a*), a rear end of the looped portion 2a of the seam 2 extends upwardly away from a rear edge of the airbag 1. A communicating portion is formed at a portion between the looped portion 2a and the rear edge of the airbag 1 for communicating the upper chamber 1b and the lower chamber 1a. A front edge of the seam 2 is connected to the front edge of the airbag 1.

A gas distributor 6A is disposed at the communicating portion, and a rod-shaped gas generator 3 is disposed in the gas distributor 6A. A substantially square heat-resistant cloth is rolled into a cylindrical shape, and one edge thereof is overlapped with the other edge to form the gas distributor 6A. Bolt insertion holes (or slits) are formed at the overlapped portion. Bolts 7c (described later) are inserted into the bolt insertion holes, so that the cloth is maintained to have a cylindrical shape. The cylindrical gas distributor 6A is disposed so that an axial direction of the cylinder is aligned in a vertical direction. The gas distributor 6A has an outlet port at a top thereof at a side of the upper chamber, and the outlet port is narrowed by a seam 6a. The outlet port at a side of the lower chamber has an opening larger than that the outlet port of the upper chamber.

The gas generator 3 is disposed so that a longitudinal direction thereof is aligned in the vertical direction. The gas generator 3 is provided with a gas injecting section 3b at a lower end thereof.

An inflator holder (hereinafter referred to as a holder) 7 holds the gas generator 3. The holder 7 includes a main plate portion 7a in a plate shape and two band portions 7b in C-shape, and bolts 7c project from the band portions 7b. The gas generator 3 is clamped between the main plate portion 7a and the band portions 7b. The bolts 7c pass through the main plate portion 7a and project to a side opposite to the band portions 7b.

As described above, the bolts 7c pass through the bolt insertion holes formed at the both edges of the cloth constituting the gas distributor 6A and the rear edge of the airbag 1, and project toward a backside of the airbag 1. The bolts 7c are secured to the case of the airbag apparatus with nuts. Accordingly, the gas generator 3 and the airbag 1 are attached to the case.

The gas generator 3 is entirely disposed in the gas distributor 6A. A lower portion of the gas distributor 6A extends downwardly more than a lower end of the gas generator 3, and constitutes a check valve 6c.

When the gas generator 3 is activated to eject the gas, the gas distributor 6A is inflated into a substantially cylindrical shape as shown in FIG. 3. The gas is distributed through the gas distributor 6A into the lower chamber 1a and the upper chamber 1b, and the airbag 1 is deployed. In this case, an outer peripheral surface of the gas distributor 6A closely contacts the occupant-side surface 1p and the vehicle-body-side surface 1q. Accordingly, the gas does not pass between the outer surface of the gas distributor 6A and the occupant-side surface 1p and the vehicle-body-side surface 1q. The outer surface of the gas distributor 6A may be joined with the occupant-side surface 1p and the vehicle-body-side surface 1q by adhesion or stitching. The upper chamber 1b is provided with a vent hole 5.

In the airbag apparatus thus constructed, when the vehicle encounters a side collision or overturn, the gas generator 3 is activated to eject the gas. The gas flows from the gas generator 3 to the lower chamber 1a and the upper chamber 1b to deploy the chambers 1a and 1b, respectively. Accordingly, as shown in FIG. 1, the airbag 1 deploys along the window side of the seat 10. The outlet port of the gas distributor 6A for the lower chamber is larger than the outlet port for the upper chamber, and the gas injection port of the gas generator 3 is disposed at the lower end of the gas distributor 6. Therefore, the lower chamber 1a deploys earlier with a higher internal pressure as compared with the upper chamber 1b.

In this airbag apparatus, the upper chamber 1b is provided with a vent hole 5. Therefore, when the occupant crushes into the upper chamber 1b, the gas in the upper chamber 1b flows out through the vent hole 5, thereby absorbing an impact on the occupant. Even when the body of the occupant crushes into the lower chamber 1a, the check valve 6c blocks communication between the lower chamber 1a and the upper chamber 1b. In other words, when the gas tries to flow from the lower chamber 1a through the gas distributor 6A to the upper chamber 1b, the lower portion of the gas distributor 6A formed of cloth (check valve 6C) is overlapped with each other so as to close the port to prevent the gas from flowing out. Consequently, the gas pressure in the lower chamber 1a is held at a high level, thereby holding a middle portion of the occupant for a long time.

Figure 10:
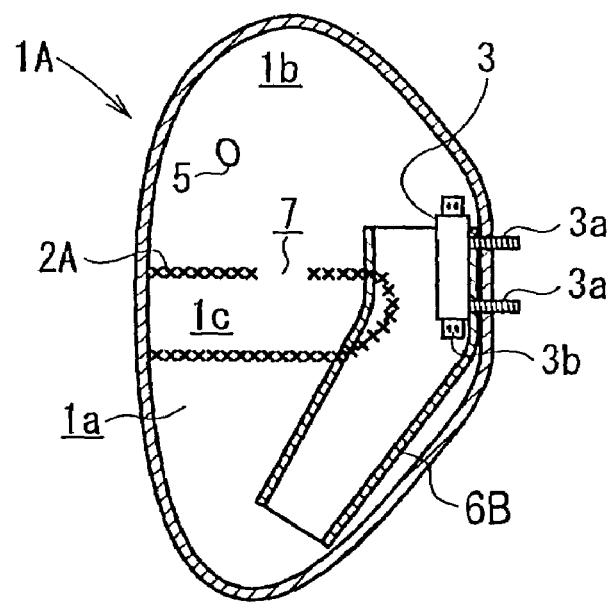
FIG. 10 is a cross-sectional view of a modified embodiment of the airbag of the second aspect of the invention.

In the embodiment described above, the interior of the airbag 1 is divided into two chambers, i.e. the upper chamber 1b and the lower chamber 1a. Alternatively, the airbag may be divided into three chambers or more, as shown in FIG. 10 explained later. The number or the positions of the check valves is not limited to the embodiment.

As described above, according to the first aspect of the present invention, the airbag apparatus can maintain the gas pressure in the lower chamber at a high level for a long time.

Figure 7:
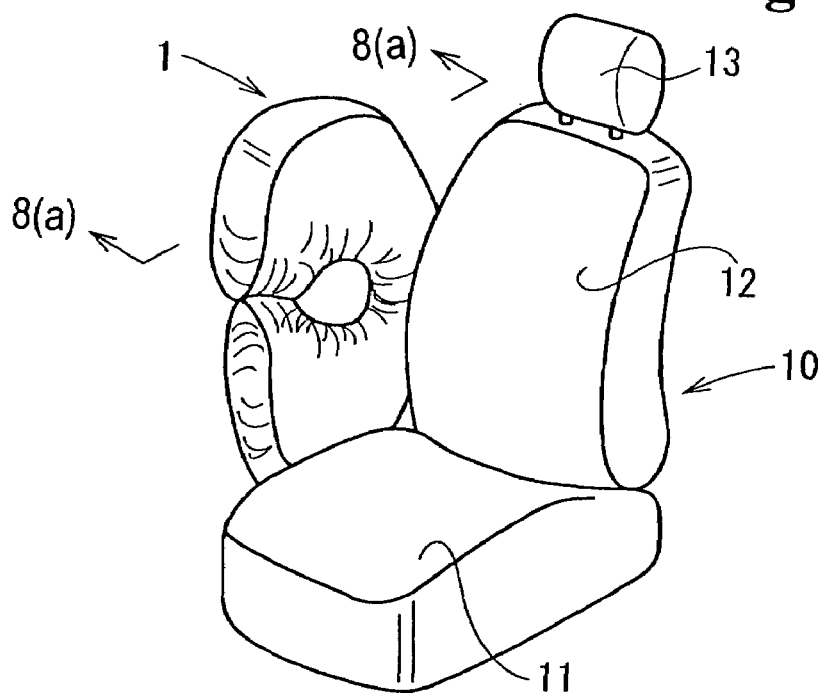
FIG. 7 is a perspective view of a seat of a vehicle provided with an airbag apparatus for a side collision according to the second aspect of the invention.

Hereunder, embodiments according to the second aspect of the present invention will be described with reference to the accompanying drawings. FIG. 7 is a perspective view of a seat of a vehicle provided with an airbag apparatus according to the embodiment. FIG. 8(*a*) is a cross-sectional view taken along line 8(*a*)—8(*a*) in FIG. 7; FIGS. 8(*b*) and 8(*c*) are cross-sectional views taken along line 8(*b*)—8(*b*) and line 8(*c*)—8(*c*) in FIG. 8(*a*), respectively. FIGS. 9(*a*) and 9(*b*) are perspective views of a check valve.

As shown in FIG. 7, an airbag 1 is constructed to be deployed along the window side of the seat 10. The seat 10 is provided with the seat cushion 11, the seatback 12, and the headrest 13. A case (not shown) of an airbag apparatus for a side collision is mounted to the side of the seatback 12. The airbag 1 is folded and stored in the case, and is covered with a module cover (not shown).

The airbag 1 has a bag shape, and is formed of two sheet members such as cloth, resin sheet, or the like (cloth in this embodiment) with peripheral edges thereof stitched together. The interior thereof is divided into a lower chamber 1a at the lower side and an upper chamber 1b at the upper side by a linear connected portion (seam in this embodiment) 2. The seam 2 connects the occupant-side surface 1p and the vehicle-body-side surface 1q at a side opposite to the occupant-side surface 1p of the airbag 1. The seam 2 has a shape substantially like a number six with a looped portion 2a.

Figure 8A:
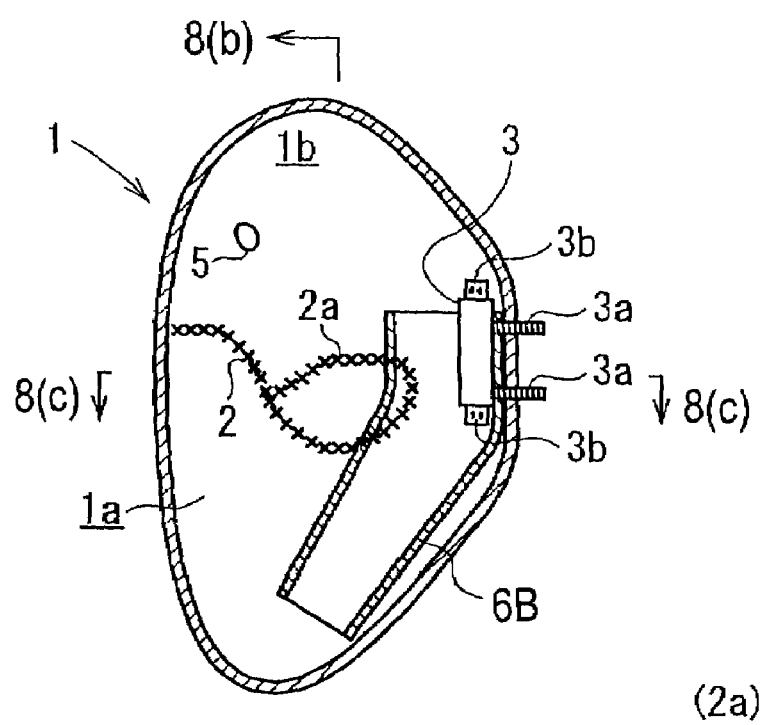
FIG. 8(a) is a cross-sectional view taken along line 8(a)—8(b) in FIG. 7.
Figure 8B:
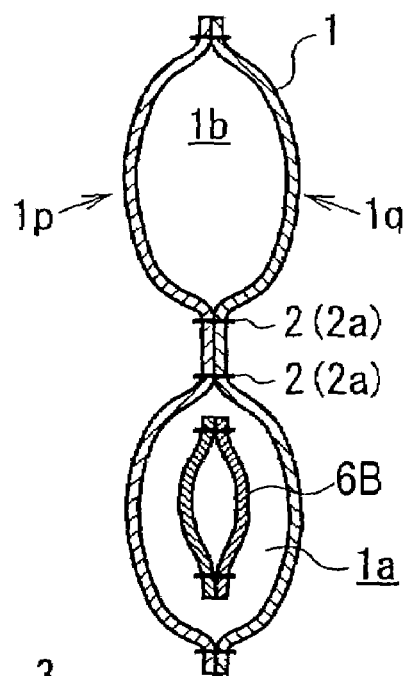
FIG. 8(b) is a cross-sectional view taken along line 8(b)—8(b) in FIG. 8(b)
Figure 8C:
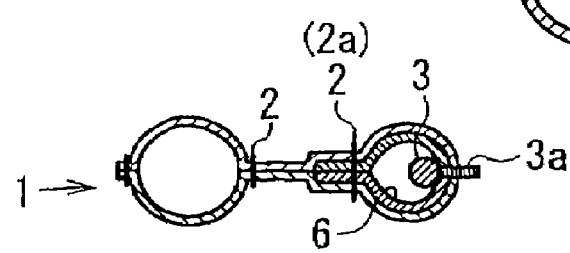
FIG. 8(c) is a cross-sectional view taken along line 8(c)—8(c) in FIG. 8(a)

As shown in FIG. 8(a), a rear end of the looped portion 2a of the seam 2 extends upwardly away from a rear edge of the airbag 1. A communicating portion is formed at a portion between the looped portion 2a and the rear edge of the airbag 1 for communicating the upper chamber 1b and the lower chamber 1a. A front edge of the seam 2 is connected to a front edge of the airbag 1.

A check valve 6B is disposed at the communicating portion, and a rod-shaped gas generator 3 is disposed therein. The gas generator 3 is disposed so that a longitudinal direction thereof is aligned in a vertical direction. The gas generator 3 is provided with gas ejecting sections 3b at an upper and a lower ends thereof. The gas ejecting section may be provided at only one end.

Two stud bolts 3a and 3a project from the gas generator 3. The stud bolts 3a and 3a pass through the check valve 6B and the rear edge of the airbag 1, and project toward a backside of the airbag 1. The stud bolts 3a and 3a are fixed to the case of the airbag apparatus with nuts. Accordingly, the gas generator 3 and the airbag 1 are fixed to the case.

Figure 9A:
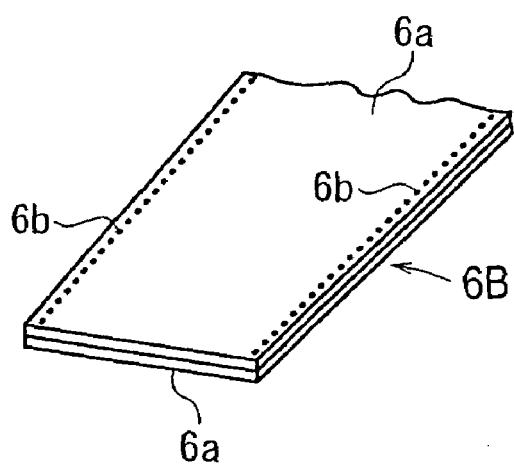
FIG. 9(a) is a perspective view of a check valve used in the airbag in FIG. 7.
Figure 9B:
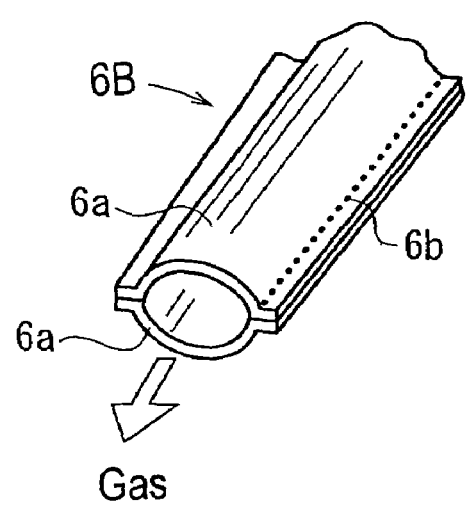
FIG. 9(b) is a perspective view in operation.

As shown in FIGS. 9(a) and 9(b), two sheets 6a are overlapped, and both sides of the two sheets are stitched with seams 6b to form the check valve 6B. It is also possible to fold one sheet and stitch one side thereof.

The occupant-side surface 1p and the vehicle-body-side surface 1q are stitched together with a side of the check valve 6B at a front side of the airbag through the looped portion 2a of the seam 2. The occupant-side surface 1p and the vehicle-body-side surface 1q are stitched with a side of the check valve 6B at a rear side of the airbag through the seam stitching the occupant-side surface 1p and the vehicle-body-side surface together along the peripheral edge of the airbag 1.

Most part of the gas generator 3 is disposed in the check valve 6B. Only an upper end portion thereof projects upwardly from the check valve 6B, and is exposed in the upper chamber 1b. When the gas generator 3 is not in operation, the sheets 6a of the check valve 6B are overlapped with each other as shown in FIG. 9(a).

As shown in FIG. 9(b), when the gas generator 3 is activated and the gas is ejected, the check valve 6B is inflated into a substantially cylindrical shape to allow the gas to pass through the check valve 6B. In this case, an outer peripheral surface of the check valve 6B closely contacts the occupant-side surface 1p and the vehicle-body-side surface 1q, so that the gas is prevented from passing between the outer surface of the check valve 6B, and the occupant-side surface 1p and the vehicle-body-side surface 1q. The outer surface of the check valve 6B may be joined with the occupant-side surface 1p and the vehicle-body-side surface 1q by adhesion or stitching. The upper chamber 1b is provided with a vent hole 5.

In the airbag apparatus thus constructed, when the vehicle encounters a side collision or overturn, the gas generator 3 is activated to eject the gas. The gas flows from the gas generator 3 to the lower chamber 1a and the upper chamber 1b to deploy the chambers 1a and 1b, respectively. Accordingly, as shown in FIG. 7, the airbag 1 deploys along the window side of the seat 10.

In the airbag apparatus, the upper chamber 1b is provided with the vent hole 5. Therefore, when the occupant crushes into the upper chamber 1b, the gas in the upper chamber 1b flows out through the vent hole 5, thereby absorbing the impact on the occupant. Even when the body of the occupant crushes into the lower chamber 1a, the check valve 6B blocks the communication between the lower chamber 1a and the upper chamber 1b. Therefore, the gas pressure in the lower chamber 1a is held at a high level, thereby holding a middle part of the occupant for a long time.

In the embodiment described above, the interior of the airbag 1 is divided into two chambers, i.e. the upper chamber 1b and the lower chamber 1a. Alternatively, the airbag may also be divided into three chambers or more. FIG. 10 is a cross-sectional view showing an airbag 1A provided with a substantially lateral U-shaped seam 2A in the airbag, and a middle chamber 1c is formed between the upper chamber 1b and the lower chamber 1a.

A front edge of the seam 2A is joined to the front edge of the airbag 1A. The seam 2A is provided with an open section 7 for communicating the upper chamber 1b and the middle chamber 1c. Other features of the airbag 1A are the same as those of the airbag 1 shown in FIGS. 7, to 9(a) and 9(b), and thus the reference numerals identical to FIGS. 7, to 9(a) and 9(b) represent the identical parts in FIG. 10.

In the embodiment shown in FIG. 10, the check valve 6B is provided, so that the gas pressure in the lower chamber 1b is maintained at a high level for a long time.

Each embodiment shown above is just an example, and the present invention may be modified other than those shown in the drawings. For example, four chambers or more may be provided. The number or the position of the check valves is not limited to the above-described embodiments.

As described above, according to the second aspect of the present invention, the airbag apparatus can maintain the gas pressure in the lower chamber at a high level for a long time.

Figure 11A:
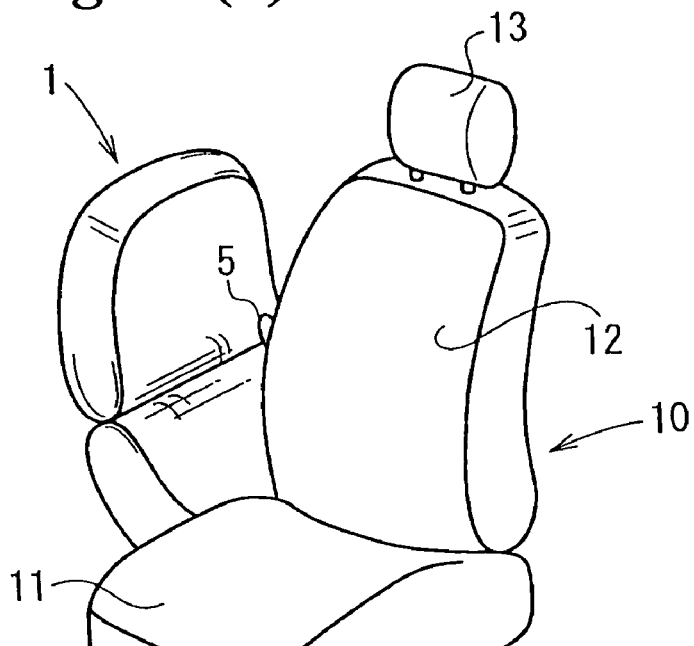
FIG. 11(a) is a perspective view of a seat of a vehicle provided with an airbag apparatus according to the third aspect of the invention.
Figure 11B:
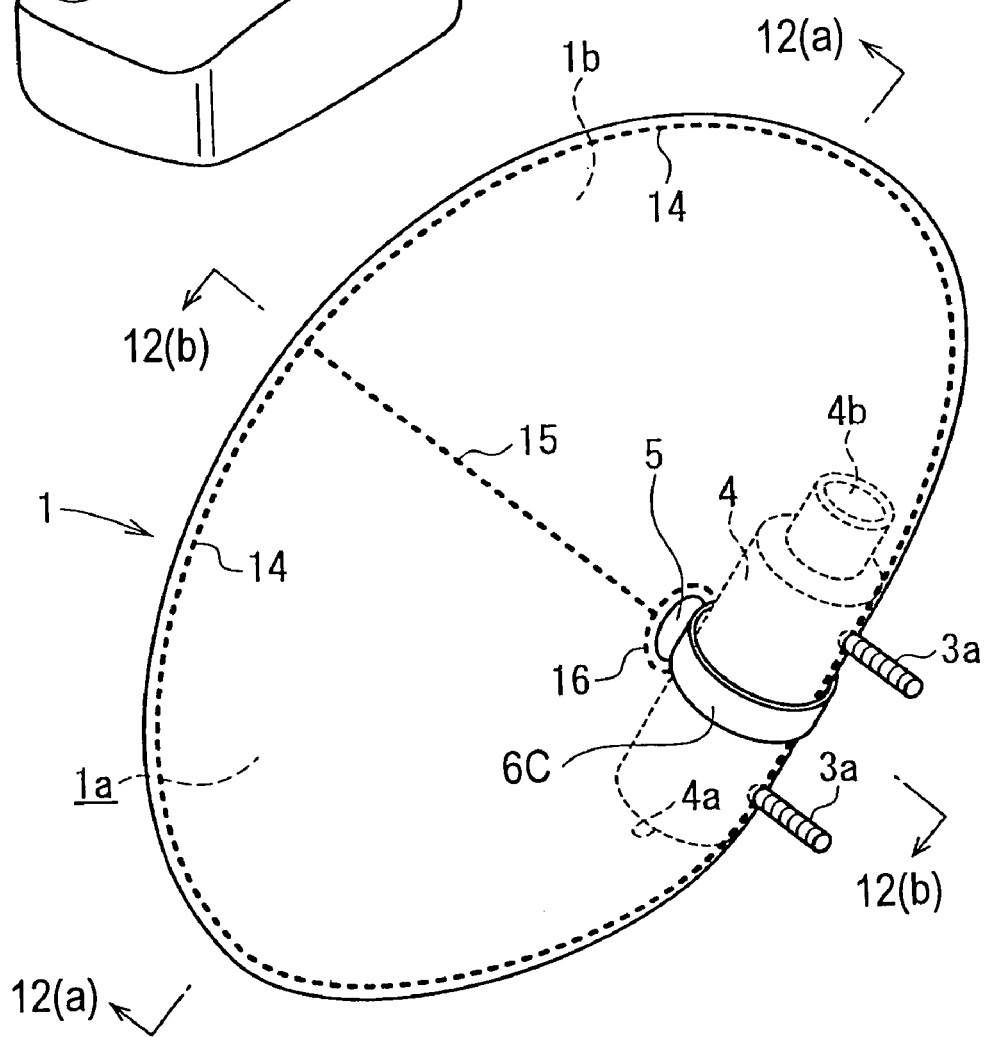
FIG. 11(b) is a side view of the airbag.
Figure 12A:
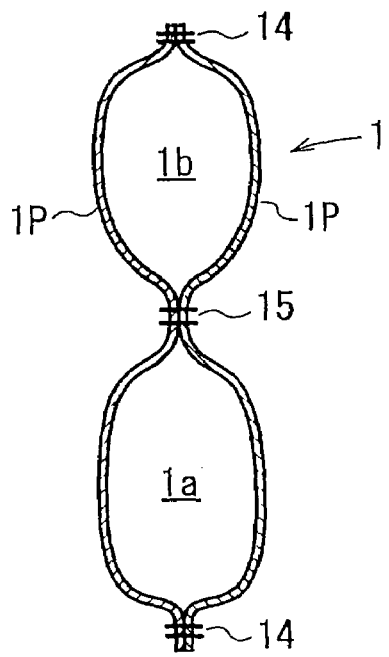
FIG. 12(a) is a sectional view taken along line 12(a)—12(a) in FIG. 11(b)
Figure 12B:
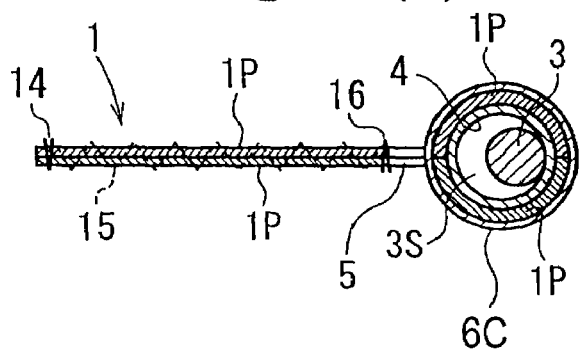
FIG. 12(b) is a sectional view taken along line 12(b)—12(b) in FIG. 11(b)

Hereunder, embodiments according to the third aspect of the present invention will be described with reference to the accompanying drawings. FIG. 11(a) is a perspective view of an automobile seat having a side airbag device according to an embodiment. FIG. 11(b) is a side view of an airbag in FIG. 11(a). FIG. 12(a) is a sectional view taken along line 12(a)—12(a) in FIG. 11(b), and FIG. 12(b) is a sectional view taken along line 12(b)—12(b) in FIG. 11(b).

As shown in FIG. 11(a), a side airbag 1 is inflated along the window side of the seat 10. The seat 10 includes the seat cushion 11, the seat back 12, and the headrest 13. A case (not shown) for the airbag device is provided at one side of the seat back 12. The side airbag 1 is folded and stored in the case, and covered by a module cover (not shown).

The side airbag 1 includes a pair of sheet panels 1P formed of, for example, fabric or resin sheet. Peripheries of the sheet panels 1P are stitched together with a thread to form a seam 14. An interior of the side airbag 1 is separated into a lower chamber 1a and an upper chamber 1b by a seam 15 formed of a thread as separating means.

A gas distributor 4 having a cylindrical shape is disposed along a rear inner edge of the side airbag 1 so that an axial direction thereof is substantially aligned in a vertical direction. A gas generator 3 having a cylindrical shape is disposed in the gas distributor 4, so that a longitudinal direction thereof is parallel to the axial direction of the gas distributor 4. A lower end of the gas generator 3 is provided with a gas exhaust nozzle.

Two stud bolts 3a and 3a protrude from the gas generator 3. The stud bolts 3a and 3a pass through the gas distributor 4 and the rear edge of the side airbag 1, and protrude toward a backside of the side airbag 1. The stud bolts 3a and 3a are fastened to the case (not shown) of the side airbag device with nuts. Thus, the gas generator 3, the gas distributor 4, and the side airbag 1 are fixed to the case.

As shown in FIG. 12(b), a space 3S for a gas passage is provided between an outer surface of the gas generator 3 and an inner surface of the gas distributor 4. A gas outlet 4a at the lower end of the gas distributor 4 is disposed in the lower chamber 1a, and a gas outlet 4b at the upper end is disposed in the upper chamber 1b. The gas outlet 4a has a diameter larger than that of the gas outlet 4b. As shown in the drawing, the gas outlet 4a face downwardly, and the gas outlet 4b face upwardly.

A hole 5 extending through the panels 1P is provided in the vicinity of the gas distributor 4 (towards the front of the side airbag 1 from the gas distributor 4). At a periphery of the hole 5, the panels 1P are stitched together in an airtight manner with a thread to form a seam 16. The seam 16 is connected with the seam 15, which is connected with the seam 14 at the front edge of the side airbag 1.

A clamp member 6C, such as a band clamp, passes through the hole 5 to wrap around the gas distributor 4 at the exterior of the side airbag 1 so as to tightly secure the side airbag 1 to the gas distributor 4. Thus, the upper chamber 1b and the lower chamber 1a are completely separated from each other in an airtight manner at the periphery side of the gas distributor 4.

In the airbag device having the structure described above, when a vehicle has a side collision or rollover, the gas is ejected from the gas generator 3. The gas is distributed from the gas outlets 4a and 4b of the gas distributor 4 to the lower chamber 1a and the upper chamber 1b to inflate the chambers 1a and 1b, respectively. As shown in FIG. 11(a), the airbag 1 is inflated along the window side of the seat 10. In this case, the lower gas outlet 4a has a diameter larger than that of the upper gas outlet 4b. Therefore, the lower chamber 1a receives a larger amount of the gas with a higher pressure than the upper chamber 1b.

The gas exhaust nozzle of the gas generator 3 is disposed at the lower part of the gas generator 3. Thus, the lower chamber 1a receives a larger amount of the gas with a higher gas pressure. As a result, the lower chamber 1a is inflated at a higher inner pressure to keep a waist of the occupant from moving horizontally. The upper chamber 1b is inflated at an inner pressure lower than that of the lower chamber 1a to receive the upper body of the occupant with a lower impact.

In this embodiment, the seam 15 as the separating means is connected with the seams 14 and 16, and the clamp member 6C extends through the hole 5 to press the panels 1P of the side airbag 1 against the periphery of the gas distributor 4 in an airtight manner. Therefore, the gas is prevented from leaking from the lower chamber 1a to the upper chamber 1b, so that the gas pressure in the lower chamber 1a is maintained sufficiently high for a longer period of time.

Figure 13:
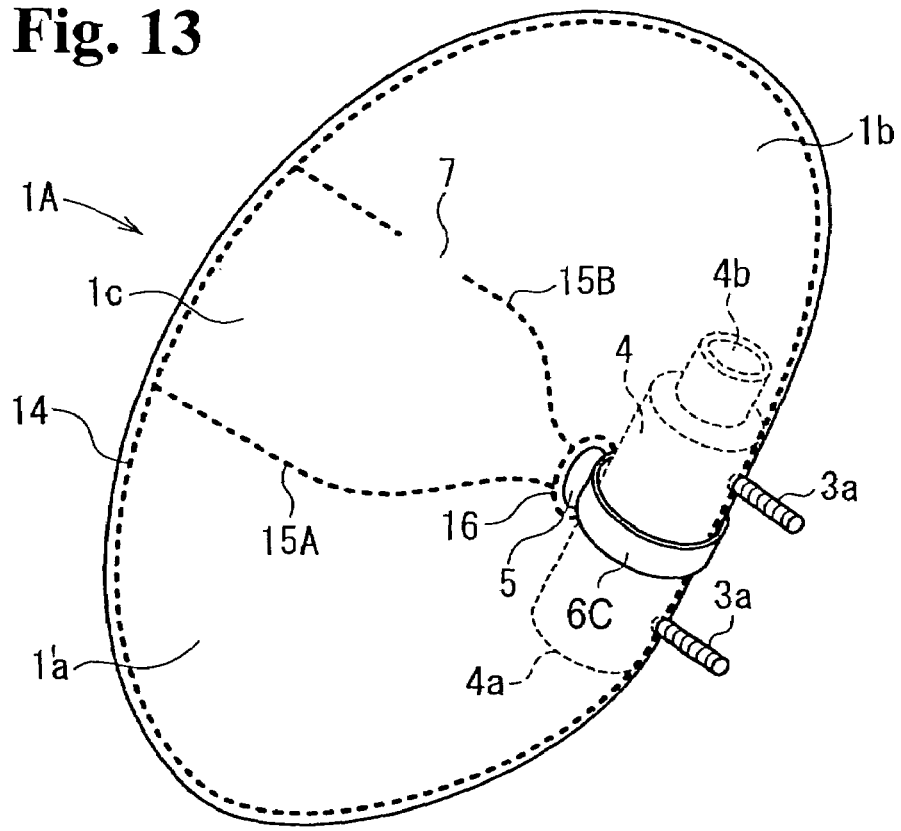
FIG. 13 is a side view of a modified embodiment of the airbag of the third aspect of the invention.
Figure 14:
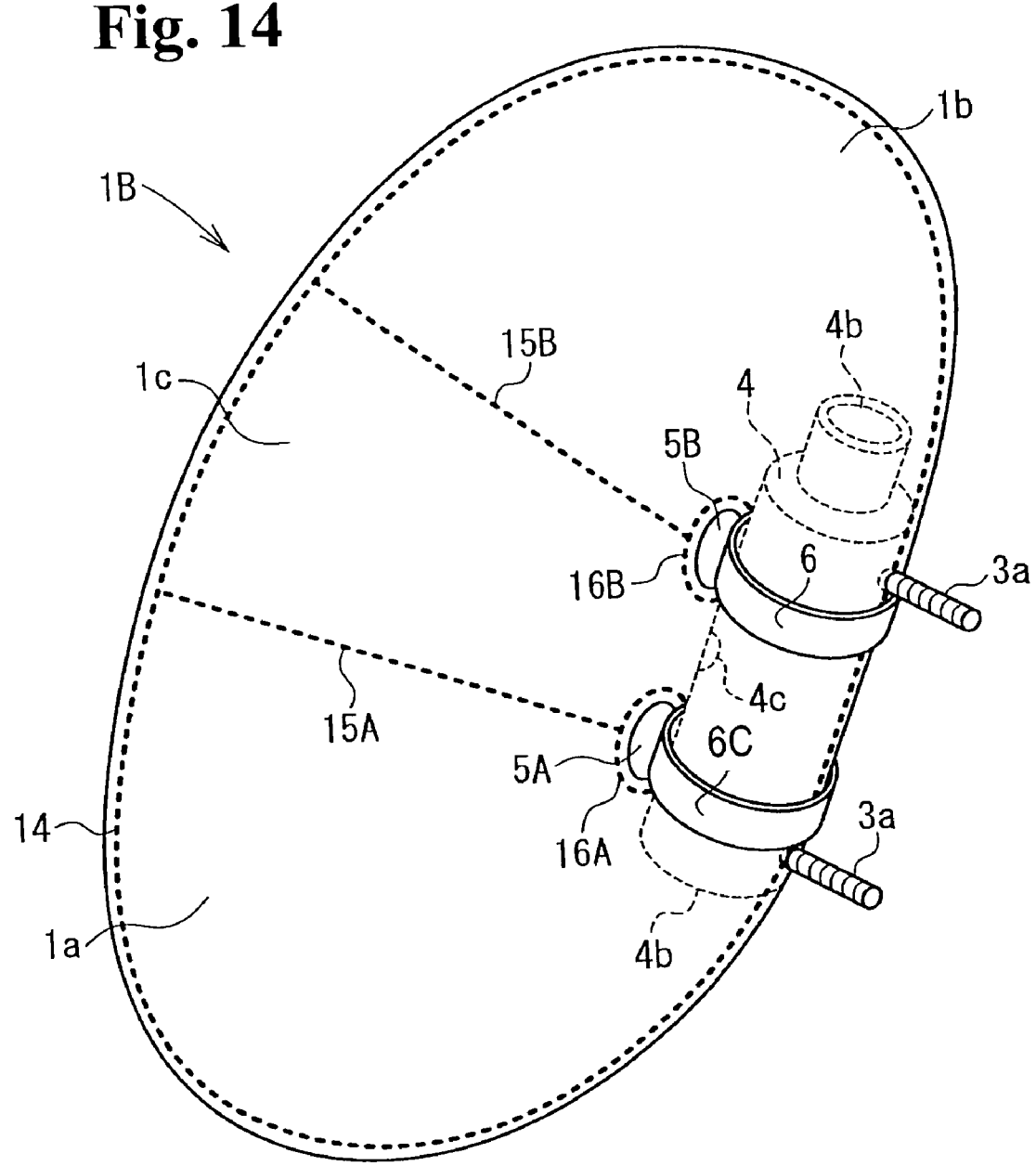
FIG. 14 is a side view of another modified embodiment of the airbag of the third aspect of the invention.
Figure 15:
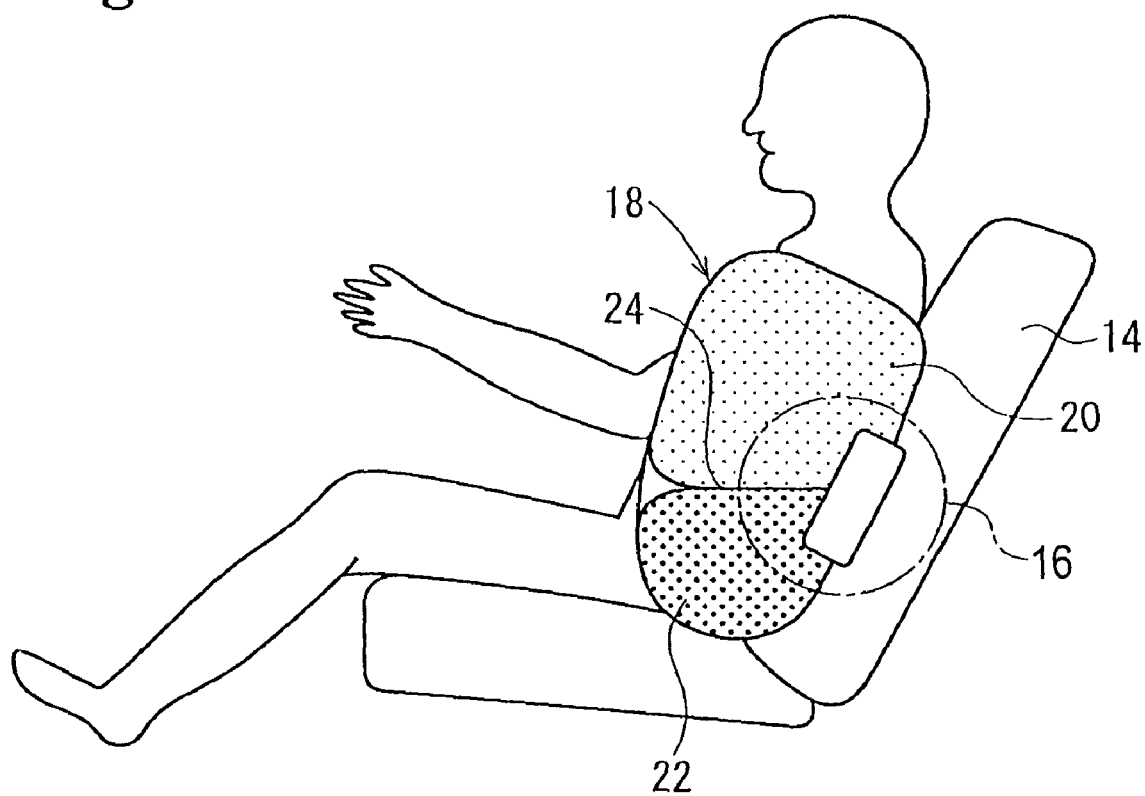
FIG. 15 is a side explanatory view of a conventional airbag apparatus.
Figure 16:
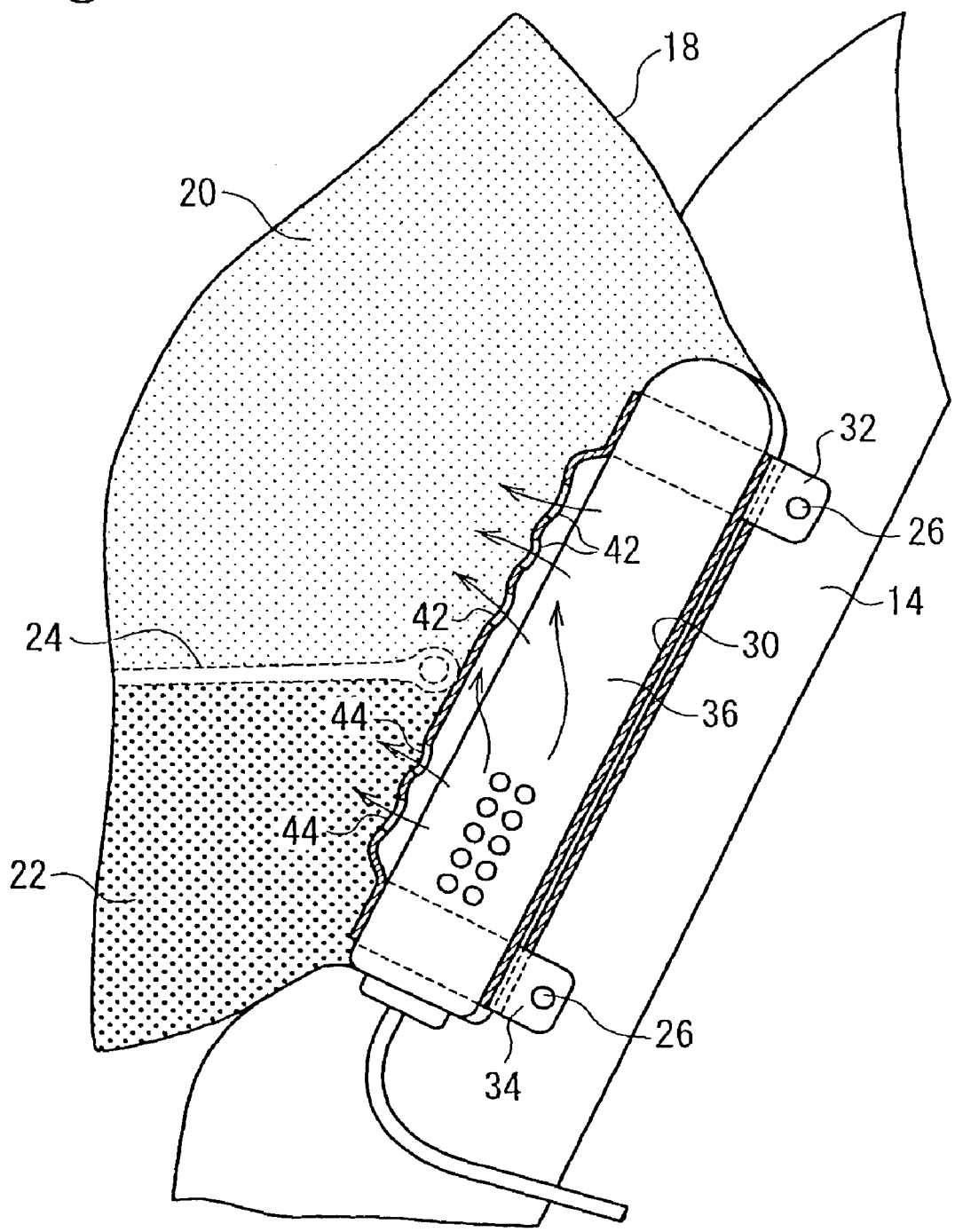
FIG. 16 is an enlarged cross sectional view of a portion 16 of FIG. 15.

In this embodiment, the gas is ejected from the gas distributor 4 in the vertical direction to rapidly inflate the side airbag 1 vertically. The airbag 1 is then inflated in the forward direction. The airbag 1 is separated into two chambers, i.e. the upper chamber 1b and the lower chamber 1a. Alternatively, the airbag 1 may be separated into three or more chambers. FIG. 13 and FIG. 14 illustrate embodiments each of which includes two seams 15A and 15B as the separating means to provide an upper chamber 1b, a lower chamber 1a, and a middle chamber 1c.

A side airbag 1A in FIG. 13 has one hole 5. The seams 15A and 15B are each connected with a seam 16 formed at the periphery of the hole 5. The seam 15B separates the upper chamber 1b from the middle chamber 1c, and is provided with a communicating portion 7 for linking the two chambers 1b and 1c. Each of the seams 15A and 15B is connected with the seam 14 at the front edge of the side airbag 1A. Other features in this embodiment are similar to those of the above-mentioned embodiment, and the similar parts are indicated with the same reference numerals.

In the side airbag 1A, when the gas generator 3 is in operation, the lower chamber 1a and the upper chamber 1b are inflated. The gas then flows into the middle chamber 1c through the communicating portion 7 from the upper chamber 1b.

In the side airbag 1A, the lower chamber 1a is separated from the middle chamber 1c and the upper chamber 1b in an airtight manner so that a high gas pressure in the lower chamber 1a is maintained for a long period of time. When the vehicle occupant plunges into the inflated upper chamber 1b, a portion of the gas in the upper chamber 1b flows into the middle chamber 1c so as to absorb the impact of the occupant.

In the side airbag 1B shown in FIG. 14, two holes 5A and 5B are provided at different positions vertically along the gas distributor 4. A seam 16A at the periphery of the hole 5A is connected with the seam 15A. A seam 16B at the periphery of the hole 5B is connected with the seam 15B. The seams 15A and 15B are each connected with the seam 14 at the front edge of the side airbag 1B. The seam 15B is not provided with a communicating portion.

A gas outlet 4c is provided between the holes 5A and 5B in the gas distributor 4 for distributing the gas into the middle chamber 1c.

Other features in the side airbag 1B are similar to those of the side airbag 1, and therefore, the similar parts are indicated with the same reference numerals.

In this embodiment, when the gas generator 3 is in operation, the lower chamber 1a, the middle chamber 1c, and the upper chamber 1b are inflated. The lower chamber 1a is inflated first with a high inner pressure. The lower chamber 1a is separated from the middle chamber 1c and the upper chamber 1b in an airtight manner, so that a high inner pressure in the lower chamber 1a is maintained for a long period of time.

The gas is directly supplied to the middle chamber 1c from the gas distributor 4, and is ejected further from the outlet 4c provided in the cylindrical surface of the gas distributor 4 so as to quickly inflate the middle chamber 1c in the forward direction.

Other than the above-mentioned embodiments, the present invention may have modifications not shown in the drawings. For example, three or more separating seams may be provided to form four or more chambers.

As described above, according to the third aspect of the present invention, the airbag can maintain a higher pressure of the lower chamber separately formed in the lower part of an airbag for a longer period of time.

While the invention has been explained with reference to the specific embodiments of the invention, the explanation is illustrative and the invention is limited only by the appended claims.

What is claimed is:

1. An airbag apparatus for protecting an occupant in a vehicle, comprising:
   an airbag having an occupant-side surface facing the occupant and a vehicle-body-side surface opposite to the occupant-side surface when the airbag is inflated, and at least an upper chamber and a lower chamber separated from each other,
   a gas generator disposed in the airbag for generating gas to inflate the airbag, a communicating portion between the upper and lower chambers, and a check valve disposed in the communicating portion for preventing the gas from flowing form the lower chamber to the upper chamber.

2. An airbag apparatus according to claim 1, wherein said occupant-side surface and said vehicle-body-side surface are joined at peripheries thereof to form a joint line, and said upper and lower chambers are defined by a partitioning joint line extending linearly, said partitioning joint line having one end away from the joint line to form the communicating portion and connecting a part of the check valve to the occupant-side surface and the vehicle-body-side surface.

3. An airbag apparatus according to claim 2, wherein said gas generator is located in the communicating portion so that an upper end of the gas generator extends slightly outwardly from the communicating portion.

4. An airbag apparatus according to claim 1, wherein said communicating portion forms a gas distributor retaining the gas generator therein and has a first outlet port for guiding the gas from the gas generator to the lower chamber and a second outlet port for guiding the gas from the gas generator to the upper chamber, said second outlet having an opening smaller than that of the first outlet port.

5. An airbag apparatus according to claim 4, wherein said gas distributor is formed of a sheet wrapping around the gas generator, and said first outlet port extends toward the lower chamber lower than the gas generator to form the check valve.

6. An airbag apparatus according to claim 4, wherein said gas distributor is formed of the sheet rolled in a cylindrical shape with edges thereof overlapped, and said gas generator is fixed with a mounting member passing through the edges.

7. An airbag apparatus according to claim 4, further comprising a bent unit formed in the upper chamber for allowing the gas to flow from the upper chamber to an outside of the airbag.

8. An airbag device for protecting an occupant in a vehicle, comprising:

an airbag having at least upper and lower chambers, at least one separating means for separating the upper and lower chambers, and a through hole with a periphery sealed by sealing means connected to the separating means, a gas generator disposed in the airbag for generating gas to inflate the airbag, a gas distributor disposed in the airbag and containing the gas generator therein, said gas distributor having a first outlet port for guiding the gas to the lower chamber and a second outlet port for guiding the gas to the upper chamber, and a clamp member disposed around the gas distributor outside the airbag and passing through the through hole for pressing the airbag against the gas distributor.

9. An airbag device according to claim 8, further comprising a middle chamber disposed in the airbag between the upper chamber and the lower chamber.

10. An airbag device according to claim 9, wherein said gas distributor further includes a third outlet port for guiding the gas to the middle chamber.

11. An airbag device according to claim 10, wherein said airbag has a plurality of through holes with peripheries thereof sealed by sealing means connected to separating means, said middle chamber being disposed between the separating means, said gas distributor having a third outlet port between the separating means.

12. An airbag device according to claim 9, further comprising a communicating portion disposed in the airbag for communicating the upper chamber and the middle chamber and for guiding the gas to the middle chamber from the gas generator via the upper chamber.

13. An airbag device according to claim 11, wherein said separating means are connected to the sealing means of one of the through holes.

* * * * *